March 14, 1967     R. I. WEINER ET AL     3,309,622

SELF-OSCILLATING NUCLEAR POWERED PULSING DEVICE

Filed Dec. 9, 1963

INVENTORS.
ROBERT I. WEINER
CHRISTOPHER P. WITZE
BY
*Sughrue, Rothwell, Mion, and Zinn*
ATTORNEYS.

United States Patent Office

3,309,622
Patented Mar. 14, 1967

3,309,622
SELF-OSCILLATING NUCLEAR POWERED
PULSING DEVICE
Robert I. Weiner, Baltimore, Md., and Christopher P.
Witze, Oakland, Calif., assignors to Martin Marietta
Corporation, New York, N.Y., a corporation of Maryland
Filed Dec. 9, 1963, Ser. No. 328,366
15 Claims. (Cl. 331—94.5)

This invention relates to a self-oscillating, nuclear powered, pulsing device and more particularly, to a device of this type which may be utilized in long range, terrestrial or space applications as the major component in a signal beacon system or radiation system.

As a result of man's conquest of space, there is increased need for signal devices which will provide extended operation for extreme ranges allowing tracking throughout the known universe. These signal beacons must be extremely compact and of relatively small mass since they must be transported by rocket or similar means beyond earth's gravitational pull. Conventional signal beacons for long range use are inherently massive, incapable of long-life, unattended operation and completely inapplicable in space communication systems.

There has been some attempt to provide signal beacons for space applications which are nuclear powered but all known devices have the disadvantages of complexity and are necessarily massive, and very costly for power levels equivalent to those at which this system can operate.

It is, therefore, a primary object of this invention to provide a light weight, simple, pulsating, high power source for both terrestrial and space applications.

It is a further object of this invention to provide an improved high power pulse source of this type which is nuclear powered for long-life and which is wholly mechanical in operation.

It is a further object of this invention to provide a nuclear powered pulse source, which is inherently safe, which eliminates all outside controls and which is highly reliable in operation.

It is a further object of this invention to provide a nuclear powered pulse source of this type which allows maximum utilization of the resulting nuclear radiation.

In the past few years, there has developed a device called a "laser" which provides a highly-concentrated, coherent source of high energy radiation principally but not limited to the visible and ultraviolet region of the spectrum, which may be visible or invisible and which has specific application as a long-range communication means and for other known purposes. The laser crystal may advantageously be pumped by neutron and/or gamma radiation emanating from a nuclear energy source.

It is, therefore, a further object of this invention to provide an improved high powered nuclear energy pulse source which has specific adaptation to a long-range, communication system.

Further objects of this invention will be pointed out in the following detailed description and claims and illustrated in the accompanying drawing which discloses by way of example the principle of this invention and the best mode which has been contemplated of applying that principle.

In general, the apparatus of the invention comprises means for supporting a pair of nuclear critical mass blocks for longitudinal movement toward and away from each other between first and second positions. Biasing means, in the form of mechanical compression springs, tend to move the blocks toward a first position in which the blocks contact each other and become supercritical. The resulting nuclear reaction or excursion takes the form of a very high pulse of energy with a high rate of thermal expansion of the surfaces in contact, such that the surfaces and any vaporization thereof act effectively as springs and force the blocks apart. The blocks move against the biasing means to a second position where the blocks become sub-critical. A self-oscillating, nuclear powered pulsing operation occurs in which appreciable electromagnetic energy is released during each pulse. In this form the device of the present invention has direct applicability as a long range terrestrial or space signal beacon. In an alternate arrangement, a laser crystal may be located co-axially of the moving blocks and thus is pumped by neutron and/or gamma radiation emanating from the device during the pulse to effect high energy laser output.

Figure 1:
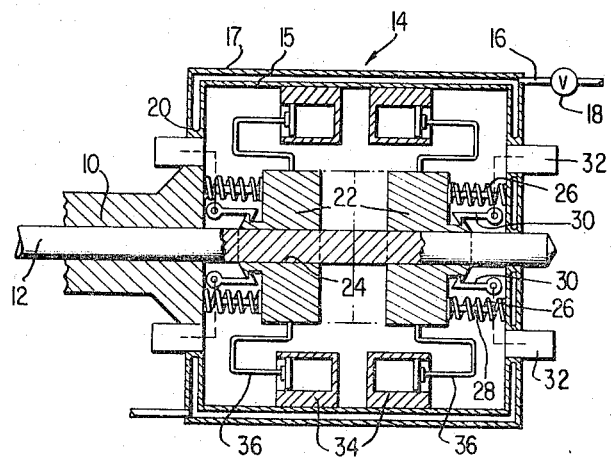
FIGURE 1 is a schematic, plan view of the compact, nuclear powered pulse source, in a preferred embodiment forming a unitary signal beacon.

Referring to the drawing, there is shown schematically in FIGURE 1 the basic elements of the subject device as applied to the compact, pulsed, nuclear powered signal beacon. A support structure 10 in the form of a fixed beam acts to support centrally thereof an extended rod-like member 12 of circular cross section which is shown extending along a generally horizontal plane. Fixed thereto is a cylindrical hollow casing or housing 14 having inner walls 15 and outer walls 17 spaced therefrom. A source of coolant is supplied through inlet tube 16 and controlled by suitable valve 18. The side walls 20 of the cylindrical housing are fixed to the support structure 10 and rod-like member 12, respectively. Within the housing 14 there is provided a pair of spaced critical mass blocks 22 which are shown as being disc-like in configuration, having hollow central openings 24 of slightly larger diameter than the support rod 12, allowing the critical mass blocks 22 to be longitudinally slideable upon the rods. The critical mass blocks may comprise pure uranium or an alloy thereof. A pair of compression springs 26 are supported by guide rods 28 and have their outer ends fixed to the inner surface of the side walls 20 with the inner ends of the compression springs 26 contacting the exterior wall surfaces of the critical blocks 22. The pair of blocks 22 are therefore biased toward each other for contact centrally of housing 14. Of course, the compression springs 26 are a schematic representation of one type of conventional biasing means and any alternate mechanical, pneumatic, electric or hydraulic biasing means tending to bias the blocks 22 into contact with each other at the center of the enclosure or housing 14 may be employed. Mechanical latches indicated at 30 and operated by suitable trigger members 32, exterior of housing 14 act to latch the blocks 22 in the extended position against the bias of springs 26, and prevent their normal movement toward the center of the housing along rod 12 to a point where the inner surfaces of the blocks come into contact.

It is readily apparent that the critical mass blocks 22 are longitudinally set in the open position and held non-critical by the latches 30 controlled through the trigger member 32. When the trigger members are released, the blocks 22 are forced together by the compression springs 26. When the blocks come into contact, the assembly goes supercritical and nuclear reaction or excursion occurs. This reaction takes the form of a very large pulse of energy. The blocks are so constructed that the rate of thermal expansion of the surfaces in contact and any surface vaporization which occurs is sufficient as to act effectively as a spring and force the blocks apart, stopping the reaction. It might be stated that the biasing means in the form of springs 26 tend to move the blocks into a first position in which the inner surfaces come into contact where the blocks become supercritical while the resultant nuclear reaction tends to move the blocks to a second position out of contact where the blocks become sub-critical. The maximum peak power pulse is controlled by the composition of material from which the blocks 22 are constructed. As is evident, the blocks are guided in their movement by slide or guide rod 12 which may take the form of a hollow tube. The entire assembly is designed to oscillate in a wholly mechanical manner at a frequency which may be controlled by the suitable application of mechanical dash pots indicated at 34. The dash pots are connected by mechanical means 36 to respective blocks 22. The assembly is powered by the rapid mechanical expansion in the fueled blocks when they go critical.

Due to the intensive heat generated as a result of nuclear reaction, the assembly may have to be cooled to maintain integrity and the cooling determines the maximum peak power available as well as the frequency of the pulse. This device for use in space could be designed to operate in radiation equilibrium but this would lower the frequency of operation. If the oscillation from the first to second position, and vice versa, is too high, the cooling means will not have time to dissipate the extremely high thermal energy released and, therefore, for this reason the dash pots 34 must be so controlled as to provide a relatively slow frequency of oscillation. The oscillations can be stopped at any time by latching the blocks in their open positions through the use of latch means associated either with the dash pots or by the mechanical latches at 30. These latches may be triggered remotely by extreme heat pulses or radiation fluxes as an added safety feature.

As mentioned previously, electromagnetic energy is released during each pulse and hence the device has inherently the potential of being used as a "pulsed" signal beacon. As a result, there is provided a light weight, reliable, safe producer of nuclear radiation that requires no external control. Once started, it can oscillate indefinitely at a frequency previously established by the dash pots. Thus the device is ideal as a signal beacon which may be cast adrift in space for extended operation. It is important to note that the device is inherently safe. If the two fissionable blocks choose to come together inadvertently as the result of dash pot failure, for instance, the ensuing nuclear reaction merely forces the blocks apart into a non-critical configuration.

It is obvious that the system is purely mechanical and requires no external control. The controls are self-contained. Once the dash pots have been set, the frequency of operation is controlled and remains stable for the long extended period required for signal beacon work in space operations. In addition, the device is easily maintainable due to the low residual radiation levels, and has great versatility for many applications other than that of a pulsed nuclear powered space signal beacon.

Figure 2:
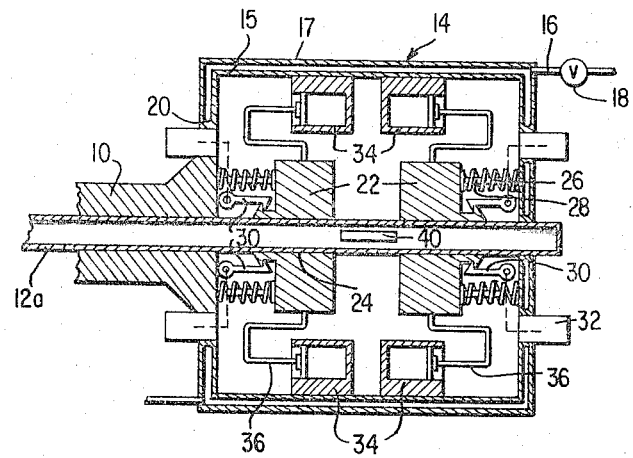
FIGURE 2 is a schematic, plan view of a second embodiment in which the pulse source is utilized to produce a laser output.

FIGURE 2 shows schematically a second embodiment of the present invention which employs all of the same elements as the device shown in FIGURE 1 including a modified central support rod 12a which slidably engages the space fuel elements 22. All of the elements which are identical to those in the embodiment of FIGURE 1 are numerically labeled the same. The rod 12a instead of being a solid support member as in the embodiment of FIGURE 1 is hollow and a laser crystal indicated at 40 is inserted within the hollow rod or tube. It is obvious that the laser crystal may be pumped by neutron and/or gamma radiation emanating from the assembly during the pulse. As a matter of fact, it is quite advantageous to place the laser crystal centrally within the hollow rod or tube 12a since the "hole-thru" geometry of the space critical mass blocks 22 allows for maximum utilization of the nuclear radiation. In this regard, the burst is much more intense inside the fissionable material than outside around the periphery thereby directing maximum radiation towards the laser crystal which is centrally located within the hollow rod 12. Understandably, the device acts to generate gamma rays, not neutrons, for specific application to lasers and related devices. The laser may provide a usable element within a communication system, or in connection with other known laser type systems. The operation of the embodiment shown in FIGURE 2 is identical to the operation in FIGURE 1 with the exception that the intense internal radiation directed toward the laser crystal is made use of, rather than the radial release of electromagnetic energy in the first embodiment for providing a long range pulse signal. It is also obvious that any device requiring nuclear radiation such as an ionization chamber, etc., could be substituted for the laser crystal within the hollow tube 12a, and as such, the pulse power supply has great application throughout the nuclear energy field.

As outlined previously, the compression springs 26 could be replaced by other biasing means tending to move the blocks 22 together along the support rod 12. Other substitutions may be made without departing from the spirit of the invention such as the replacement of the mechanical dash pots 34 with electrical dash pots or like devices, and solenoid means may be readily substituted for the mechanical latching devices schematically shown at 30 for locking the blocks 22 in extended position against the bias of the compression springs 26.

While there have been shown and described and pointed out the fundamental features of the invention as applied to a preferred embodiment, it will be understood that various omissions and substitutions and changes in the form and detail of the device illustrated and in its detail may be made by those skilled in the art without departing from spirit of the invention. It is the intention, therefore, to be limited only as indicated by the scope of the following claims.

What is claimed is:

1. A self-oscillating, nuclear powered, pulsing device comprising:
   means for supporting a pair of nuclear critical mass blocks for movement between first and second positions,
   releasable means for latching said blocks in said second positions,
   biasing means continually tending to move said blocks toward a first position in which said blocks physically contact each other to become supercritical when said releasable means are released,
   whereby physical forces are created between said blocks tending to move said blocks against said biasing means to a second position wherein said blocks become sub-critical, said biasing means and said physical forces coacting on said blocks to effect a continuing oscillation of said blocks between said second and said first positions producing a pulsed nuclear radiation output when said blocks are in physical contact.

2. The apparatus claimed in claim 1 further including means for controlling the rate of movement of said blocks from said second position to said first position.

3. A compact, purely mechanical, self-oscillating, nuclear powered, pulsing device comprising:
   means for supporting a pair of nuclear critical mass blocks for longitudinal movement toward and away from each other between first and second positions,
   biasing means continually tending to move said blocks toward said first position in which said blocks physically contact each other to become supercritical,
   whereby physical forces are created between said blocks tending to move said blocks away from each other against said biasing means to a second position wherein said blocks become sub-critical, said biasing means and said physical forces coacting on said blocks to effect a continuing oscillation of said blocks between said second and said first positions producing a pulsed nuclear radiation output when said blocks are in physical contact, means for controlling the rate of movement of said blocks from said second position to said first position, and means for latching said blocks in said first position.

4. The apparatus as claimed in claim 3 further including trigger means acting to release said latching means to allow said blocks to move under bias from said second position to said first position.

5. Apparatus as claimed in claim 1 wherein said device further includes means surrounding said assembly for dissipating the heat energy resulting from nuclear reaction.

6. A compact, light weight, self-oscillating, nuclear powered, pulsing device comprising:

a hollow casing having spaced walls including means for delivering a cooling fluid therebetween, a fixed rod passing through the said casing, a pair of nuclear critical mass blocks slidably positioned on said rod for movement toward and away from each other between first and second positions, compression springs positioned between the outer faces of said blocks and the inner surface of said hollow casing for biasing the blocks to a first position in which said blocks contact each to become super-critical, mechanical dash pots positioned within said housing and connected to respective critical mass blocks for controlling the rate of movement from said second position to said first position, latching means for mechanically latching said blocks in said second position as a result of movement thereto upon nuclear reaction between said blocks in said first position and trigger means located exterior of said housing for releasing said latching means and allowing said blocks to move under the bias of said compression springs from said second position to said first position.

7. Apparatus claimed in claim 1 wherein said support means comprises a hollow tube, a laser crystal positioned within such tube coaxial of said movable critical mass blocks whereby resulting gamma radiation stimulates said laser crystal to effect pulsed laser output at a frequency commensurate with the frequency of operation of said pulsing device.

8. A compact, pulsed, nuclear powered radiation system comprising:

means for supporting a pair of nuclear critical mass blocks for movement between first and second positions, releasable means for latching said blocks in said second positions, biasing means continually tending to move said blocks toward a first position in which said blocks physically contact each other to become super-critical when said releasable means are released, and where said blocks, as a result of nuclear excursion are moved against said biasing means to a second position wherein said blocks become sub-critical, said biasing means and the forces on said blocks resulting from said nuclear excursion coacting on said blocks to effect a continuing oscillation of said blocks between said second and said first positions producing a pulsed radiation emission when said blocks are in physical contact, and a laser crystal positioned in the vicinity of said critical mass blocks and stimulated by said pulsed radiation emission from said blocks as a result of said nuclear excursion.

9. The apparatus as claimed in claim 8 further including dash pot means for controlling the rate of movement of said critical mass blocks from said second position to said first position.

10. The apparatus as claimed in claim 8 wherein said apparatus further includes cooling means for dissipating the thermal energy released as a result of nuclear excursion.

11. A self-oscillating, nuclear powered, pulsing device comprising:

a pair of nuclear critical mass blocks, means for supporting said pair of blocks for movement of at least one of said blocks towards the other from a first position at which said blocks are subcritical to a second position at which said blocks become supercritical and then away from the other to said first position, releasable means for latching at least said one block in its said first position, biasing means continually urging at least said one block towards the other when said releasable means are released, and second means responsive to said supercritical condition for returning at least said one block to said first position against said biasing means, said biasing means coacting with said second means on said one block to effect a continuing oscillation of said one block between said first position and said second position producing a pulsed nuclear radiation output when said one block is in said second position.

12. The apparatus claimed in claim 11 wherein said blocks are in contact when said one block is in its said second position and said second means includes the force produced between said pair of blocks by thermal expansion of the surfaces thereof when said blocks become supercritical.

13. The apparatus claimed in claim 11 including additionally means for controlling the rate of movement of at least said one block between its said first and second positions.

14. The apparatus claimed in claim 11 including additionally a housing enclosing said blocks and third means in heat transfer relationship with said block and said housing for removing therefrom thermal energy resulting from said blocks becoming supercritical.

15. The apparatus claimed in claim 11 including additionally a laser crystal in operative relationship with the gamma radiation resulting from said blocks becoming supercritical to produce a laser output.

References Cited by the Examiner

UNITED STATES PATENTS

| | | | |
|---|---|---|---|
| 2,955,088 | 10/1960 | Beerbower | 176—10 X |
| 2,993,850 | 7/1961 | Soodak et al. | 176—40 X |
| 3,070,697 | 12/1962 | Muench | 176—11 |

OTHER REFERENCES

Nuclear Science Abstracts, vol. 17, No. 11, June 15, 1963, p. 2786, abstract 21372 of an article by L. B. Wilker.

Peterson et al.: Nuclear Science and Engineering, vol. I (1956), pp. 112–117.

REUBEN EPSTEIN, *Primary Examiner.*